United States Patent
Gaddi et al.

(10) Patent No.: US 9,683,062 B2
(45) Date of Patent: Jun. 20, 2017

(54) PROCESS FOR THE PREPARATION OF POROUS PROPYLENE POLYMERS

(71) Applicant: BASELL POLIOLEFINE ITALIA S.R.L.

(72) Inventors: Benedetta Gaddi, Ferrara (IT); Marco Bocchino, Ferrara (IT); Gianni Collina, Ferrara (IT); Ofelia Fusco, Ferrara (IT); Simona Guidotti, Ferrara (IT); Antonio Mazzucco, Ferrara (IT); Roberto Pantaleoni, Ferrara (IT); Fabrizio Piemontesi, Ferrara (IT)

(73) Assignee: Basell Poliolefin Italia S.r.l., Milan (IT)

( * ) Notice: Subject to any disclaimer, the term of this patent is extended or adjusted under 35 U.S.C. 154(b) by 0 days.

(21) Appl. No.: 15/031,913

(22) PCT Filed: Oct. 21, 2014

(86) PCT No.: PCT/EP2014/072501
§ 371 (c)(1),
(2) Date: Apr. 25, 2016

(87) PCT Pub. No.: WO2015/059117
PCT Pub. Date: Apr. 30, 2015

(65) Prior Publication Data
US 2016/0304642 A1 Oct. 20, 2016

(30) Foreign Application Priority Data

Oct. 24, 2013 (EP) .................................... 13190082

(51) Int. Cl.
| | | |
|---|---|---|
| C08J 9/00 | (2006.01) | |
| C08F 210/06 | (2006.01) | |
| C08F 10/06 | (2006.01) | |
| C08F 210/02 | (2006.01) | |

(52) U.S. Cl.
CPC ............ *C08F 210/02* (2013.01); *C08F 10/06* (2013.01); *C08J 9/0052* (2013.01); *C08J 9/0066* (2013.01)

(58) Field of Classification Search
CPC ....... C08F 210/02; C08F 10/06; C08J 9/0052; C08J 9/0066
See application file for complete search history.

(56) References Cited

U.S. PATENT DOCUMENTS

| | | | | |
|---|---|---|---|---|
| 2007/0275850 | A1* | 11/2007 | Brita ...................... | C08F 10/00 502/152 |
| 2009/0156758 | A1 | 6/2009 | Pater et al. | |
| 2012/0232221 | A1* | 9/2012 | Collina ................... | C08F 10/06 525/240 |
| 2014/0316069 | A1 | 10/2014 | Galvan et al. | |

FOREIGN PATENT DOCUMENTS

| | | |
|---|---|---|
| CN | 101379129 A | 3/2009 |
| EP | 2594593 A1 | 5/2013 |
| WO | WO-2007033941 A1 | 3/2007 |
| WO | WO-2007090519 A1 | 8/2007 |
| WO | WO-2011061134 A1 | 5/2011 |

OTHER PUBLICATIONS

PCT International Search Report and the Written Opinon—Mailed Dec. 11, 2014 (Dec. 11, 2014) for Corresponding PCT/EP2014/072501.

* cited by examiner

*Primary Examiner* — Kara Boyle

(57) ABSTRACT

The present disclosure relates to a process for the preparation of a porous propylene carried out in the presence of a catalyst system comprising (a) a Ziegler-Natta catalyst containing at least two electron donor compounds, one of which is present in an amount from 50 to 90% by mol with respect to the total amount of donors and selected from succinates, and the other being selected from 1,3 diethers, (b) an aluminum alkyl and comprising the following steps:

i) contacting the catalyst components (a) and (b) for a period of time ranging from 1 to 60 minutes, at a temperature ranging from 35 to 55° C.; optionally, ii) pre-polymerizing with one or more olefins of formula $CH_2=CHR$, where R is H or a $C_1$-$C_{10}$ hydrocarbon group, up to forming amounts of polymer from about 0.1 up to about 1000 g per gram of solid catalyst component (a); and iii) polymerizing propylene in the optional presence of minor amounts of ethylene and/or $C_4$-$C_{10}$ alpha olefins for producing the porous propylene (co)polymer.

8 Claims, No Drawings

PROCESS FOR THE PREPARATION OF POROUS PROPYLENE POLYMERS

This application is the U.S. National Phase of PCT International Application PCT/EP2014/072501, filed Oct. 21, 2014, claiming benefit of priority to European Patent Application No. 13190082.1 filed Oct. 24, 2013, the contents of which are incorporated herein by reference in its entirety.

FIELD OF THE INVENTION

The present disclosure relates to a process for the preparation of isotactic porous propylene polymers. The porous propylene polymers are useful to prepare heterophasic copolymers comprising the isotactic porous propylene polymer as a polymer matrix within which a low crystallinity ethylene containing copolymer can be included.

BACKGROUND OF THE INVENTION

The preparation of heterophasic copolymers via the sequential polymerization is sometimes referred to as the "in situ blending of polymers.". According to this technique, a relatively high crystalline propylene polymer is prepared in a first polymerization reactor and then transferred to a successive polymerization reactor, wherein a low crystallinity elastomeric component (for instance, a propylene-ethylene copolymer) is formed.

In this process, where each reactor can work at different polymerization conditions, in terms of catalyst, pressure, temperature, amounts of comonomer(s) and molecular weight regulator(s), the tailoring of the process conditions allows to produce a wide range of heterophasic propylene copolymers, as well as different concentrations of semicrystalline component and low crystallinity elastomeric component. Processes of this type are described, for example, in EP Pat. Doc. No. 640649 and WIPO Pat. Doc. No. WO2010/146074 where the catalyst system is formed by pre-contacting, before the first polymerization step, a solid catalyst component of the Ziegler-Natta type, in which a phthalate or a mixture of 1,3-diether and succinate are used as internal donor, a trialkyl-aluminum co-catalyst and an alkyl alkoxysilane as external electron donor to improve stereospecificity. In both cases, the precontacting temperature is set preferably in the range 0-30° C. In EP Pat. Doc. No. 640649 the precontacting temperature is 0° C. while in WIPO Pat. Doc. No. WO2010/146074 a temperature of 25° C. is used.

When the sequential polymerization process is directed to the preparation of heterophasic copolymers with a relevant amount of low crystallinity elastomeric polymer, the porosity of the relatively high crystallinity polymer matrix plays an important role.

As a general rule, the higher is the porosity of the polymer matrix produced in the first step, the higher is the amount of elastomeric component that can be incorporated, within the matrix, in the second polymerization step.

On the other hand, if the porosity of the matrix is poor, the presence of an excessive amount of elastomeric polymer fraction on the surface of the particles considerably increases the tackiness of the particles giving raise to agglomeration phenomena, which in turn can cause reactor walls sheeting, plugging or even clogging.

An important macroscopic measurement of the polymer porosity is given by the polymer bulk density. The bulk density or apparent density is the mass per unit of volume of a material, including voids inherent in the material of interest. In case of polymer particles of regular morphology, relatively low values of bulk density indicate a relatively high porosity of the polymer powder. Thus, at least for certain applications it would be desired to produce in the first polymerization step a propylene polymer endowed with both higher porosity (lower bulk density) and high crystallinity.

As described in WIPO Pat. Doc. No. WO2008/015113, it is possible to modulate the porosity of the polymer matrix produced in the first polymerization step by careful selection of catalyst pre-contact and polymerization step. In particular, contacting the Z—N catalyst component (including a donor selected from the group consisting of, among others, phthalates, succinates and ethers) with an alkyl-Al compound, an external donor compound, optionally in the presence of propylene, at a temperature from 5° C. to 30° C. and a weight ratio propylene/(catalytic component) ranging from 0 to 2.0 in order to prepare a high crystallinity polymer matrix having a value of bulk density lower than 0.40 g/cm$^3$ is possible. As further described therein, the bulk density of the semi-crystalline matrix may be decreased by setting the pre-contact temperature in the higher end of the range 5-30° C. WIPO Pat. WO2010/146074 further describes an improvement in polymer porosity with respect to the 0° C. pre-contact temperature of EP Pat. Doc. No. 640649. However, the working examples of the cited reference do not explore the whole range of pre-contact temperatures but limit the treatment in the range of 15-25° C. By comparison of Examples 1 and 2 it is possible to see that the increase of pre-contact temperature involves a decrease of polymer bulk density (therefore higher porosity) but also a decrease of catalyst stereospecificity demonstrated by the higher amount of xylene soluble matter. It is therefore clear that the 30° C. upper limit for the pre-contact temperature has its technical basis on the necessary compromise between high porosity and high crystallinity. In fact, the comparative runs carried out by the applicant confirm that by pre-contacting at 30° C. a Z—N catalyst component containing phthalates, an aluminum alkyl and an alkoxysilane, the decrease in stereospecificity is even more pronounced.

In view of the above, it has been very surprising to discover that with a specific catalyst containing both diethers and succinates as internal donors, higher pre-contact temperatures can be used without substantially observing decrease of stereospecificity.

SUMMARY OF THE INVENTION

Accordingly, it is an object of the present disclosure a process for the preparation of a porous propylene (co) polymer having a porosity higher than 0.33 cm$^3$/g carried out in the presence of a catalyst system comprising (a) a solid catalyst component comprising a magnesium halide, a titanium compound having at least a Ti-halogen bond and at least two electron donor compounds, one of which being present in an amount from 50 to 90% by mol with respect to the total amount of donors and selected from succinates and 1,3 diethers, (b) an aluminum alkyl and optionally (c) an external electron donor compound, and comprising the following steps:

(i) contacting the catalyst components (a), (b) and optionally (c) for a period of time ranging from 1 to 60 minutes, at a temperature ranging from 35 to 55° C.; optionally;

(ii) pre-polymerizing with one or more olefins of formula $CH_2=CHR$, where R is H or a $C_1$-$C_{10}$ hydrocarbon group, up to forming amounts of polymer from about 0.1 up to about 1000 g per gram of solid catalyst component (a); and (iii) polymerizing propylene in the optional presence of minor amounts of ethylene and/or $C_4$-$C_{10}$ alpha olefins producing said porous propylene (co)polymer.

DETAILED DESCRIPTION OF THE INVENTION

The succinate present in the solid catalyst component (a) is selected from succinates of formula (I) below:

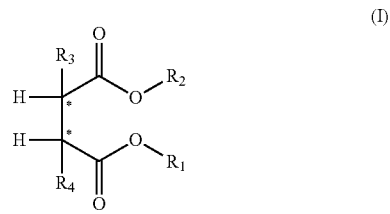

in which the radicals $R_1$ and $R_2$, equal to, or different from, each other are a $C_1$-$C_{20}$ linear or branched alkyl, alkenyl, cycloalkyl, aryl, arylalkyl or alkylaryl group, optionally containing heteroatoms; and the radicals $R_3$ and $R_4$ equal to, or different from, each other, are $C_1$-$C_{20}$ alkyl, $C_3$-$C_{20}$ cycloalkyl, $C_5$-$C_{20}$ aryl, arylalkyl or alkylaryl group with the proviso that at least one of them is a branched alkyl; said compounds being, with respect to the two asymmetric carbon atoms identified in the structure of formula (I), stereoisomers of the type (S,R) or (R,S).

In some embodiments, $R_1$ and $R_2$ are $C_1$-$C_8$ alkyl, cycloalkyl, aryl, arylalkyl and alkylaryl groups, including primary alkyls and branched primary alkyls. Examples of suitable $R_1$ and $R_2$ groups are methyl, ethyl, n-propyl, n-butyl, isobutyl, neopentyl and 2-ethylhexyl.

In certain embodiments, compounds in which the $R_3$ and/or $R_4$ radicals are secondary alkyls like isopropyl, sec-butyl, 2-pentyl and 3-pentyl or cycloalkyls like cyclohexyl, cyclopentyl and cyclohexylmethyl are contemplated.

Examples of the above-mentioned compounds are the (S,R) (S,R) forms in pure forms or in mixtures, optionally in racemic forms, of diethyl 2,3-bis(trimethylsilyl)succinate, diethyl 2,3-bis(2-ethylbutyl)succinate, diethyl 2,3-dibenzyl succinate, diethyl 2,3-diisopropyl succinate, diisobutyl 2,3-diisopropylsuccinate, diethyl 2,3-bis(cyclohexylmethyl)succinate, diethyl 2,3-diisobutylsuccinate, diethyl 2,3-dineopentyl succinate, diethyl 2,3-dicyclopentyl succinate and diethyl 2,3-dicyclohexyl succinate.

Among the 1,3-diethers mentioned above, in some embodiments compounds of formula (II) are utilized:

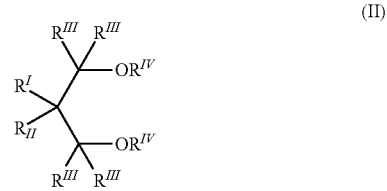

where $R^I$ and $R^{II}$ are the same or different and are hydrogen or linear or branched $C_1$-$C_{18}$ hydrocarbon groups which can also form one or more cyclic structures; $R^{III}$ groups, equal or different from each other, are hydrogen or $C_1$-$C_{18}$ hydrocarbon groups; $R^{IV}$ groups equal or different from each other, have the same meaning of $R^{III}$ except that they cannot be hydrogen; and each of $R^I$ to $R^{IV}$ groups can contain heteroatoms selected from halogens, N, O, S and Si.

In further embodiments, $R^{IV}$ is a 1-6 carbon atom alkyl radical such as a methyl radical while the $R^{III}$ radicals may be hydrogen. Moreover, when $R^I$ is methyl, ethyl, propyl, or isopropyl, $R^{II}$ can be ethyl, propyl, isopropyl, butyl, isobutyl, tert-butyl, isopentyl, 2-ethylhexyl, cyclopentyl, cyclohexyl, methylcyclohexyl, phenyl or benzyl; when $R^I$ is hydrogen, $R^{II}$ can be ethyl, butyl, sec-butyl, tert-butyl, 2-ethylhexyl, cyclohexylethyl, diphenylmethyl, p-chlorophenyl, 1-naphthyl, 1-decahydronaphthyl; $R^I$ and $R^{II}$ can also be the same and can be ethyl, propyl, isopropyl, butyl, isobutyl, tert-butyl, neopentyl, phenyl, benzyl, cyclohexyl and cyclopentyl.

Specific examples of ethers that may be used include: 2-(2-ethylhexyl)1,3-dimethoxypropane, 2-isopropyl-1,3-dimethoxypropane, 2-butyl-1,3-dimethoxypropane, 2-sec-butyl-1,3-dimethoxypropane, 2-cyclohexyl-1,3-dimethoxypropane, 2-phenyl-1,3-dimethoxypropane, 2-tert-butyl-1,3-dimethoxypropane, 2-cumyl-1,3-dimethoxypropane, 2-(2-phenylethyl)-1,3-dimethoxypropane, 2-(2-cyclohexylethyl)-1,3-dimethoxypropane, 2-(p-chlorophenyl)-1,3-dimethoxypropane, 2-(diphenylmethyl)-1,3-dimethoxypropane, 2(1-naphthyl)-1,3-dimethoxypropane, 2(p-fluorophenyl)-1,3-dimethoxypropane, 2(1-decahydronaphthyl)-1,3-dimethoxypropane, 2(p-tert-butylphenyl)-1,3-dimethoxypropane, 2,2-dicyclohexyl-1,3-dimethoxypropane, 2,2-diethyl-1,3-dimethoxypropane, 2,2-dipropyl-1,3-dimethoxypropane, 2,2-dibutyl-1,3-dimethoxypropane, 2,2-diethyl-1,3-diethoxypropane, 2,2-dicyclopentyl-1,3-dimethoxypropane, 2,2-dipropyl-1,3-diethoxypropane, 2,2-dibutyl-1,3-diethoxypropane, 2-methyl-2-ethyl-1,3-dimethoxypropane, 2-methyl-2-propyl-1,3-dimethoxypropane, 2-methyl-2-benzyl-1,3-dimethoxypropane, 2-methyl-2-phenyl-1,3-dimethoxypropane, 2-methyl-2-cyclohexyl-1,3-dimethoxypropane, 2-methyl-2-methylcyclohexyl-1,3-dimethoxypropane, 2,2-bis(p-chlorophenyl)-1,3-dimethoxypropane, 2,2-bis(2-phenylethyl)-1,3-dimethoxypropane, 2,2-bis(2-cyclohexylethyl)-1,3-dimethoxypropane, 2-methyl-2-isobutyl-1,3-dimethoxypropane, 2-methyl-2-(2-ethylhexyl)-1,3-dimethoxypropane, 2,2-bis(2-ethylhexyl)-1,3-dimethoxypropane, 2,2-bis(p-methylphenyl)-1,3-dimethoxypropane, 2-methyl-2-isopropyl-1,3-dimethoxypropane, 2,2-diisobutyl-1,3-dimethoxypropane, 2,2-diphenyl-1,3-dimethoxypropane, 2,2-dibenzyl-1,3-dimethoxypropane, 2-isopropyl-2-cyclopentyl-1,3-dimethoxypropane, bis(cyclohexylmethyl)-1,3-dimethoxypropane, 2,2-diisobutyl-1,3-diethoxypropane, 2,2-diisobutyl-1,3-dibutoxypropane, 2-isobutyl-2-isopropyl-1,3-dimethoxypropane, 2,2-di-sec-butyl-1,3-dimethoxypropane, 2,2-di-tert-butyl-1,3-dimethoxypropane, 2,2-dineopentyl-1,3-dimethoxypropane, iso-propyl-2-isopentyl-1,3-dimethoxypropane, 2-phenyl-2-benzyl-1,3-dimethoxypropane and 2-cyclohexyl-2-cyclohexylmethyl-1,3-dimethoxypropane. Furthermore, 1,3-diethers of formula (III) may be used:

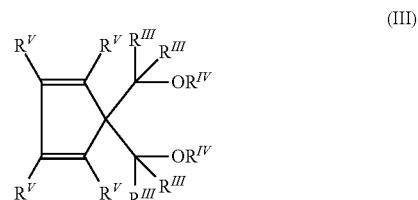

where the radicals $R^{IV}$ have the same meaning explained above and the radicals and $R^V$ radicals, equal or different to each other, are selected from the group consisting of hydrogen; halogens, including Cl and F; $C_1$-$C_{20}$ alkyl radicals, linear or branched; $C_3$-$C_{20}$ cycloalkyl, $C_6$-$C_{20}$ aryl, $C_7$-$C_{20}$ alkylaryl and $C_7$-$C_{20}$ arylalkyl radicals and two or more of the $R^V$ radicals can be bonded to each other to form condensed cyclic structures, saturated or unsaturated, optionally substituted with $R^{VI}$ radicals selected from the group consisting of halogens, including Cl and F; $C_1$-$C_{20}$ alkyl radicals, linear or branched; $C_3$-$C_{20}$ cycloalkyl, $C_6$-$C_{20}$ aryl, $C_7$-$C_{20}$ alkylaryl and $C_7$-$C_{20}$ aralkyl radicals; said radicals $R^V$ and $R^{VI}$ optionally containing one or more heteroatoms as substitutes for carbon or hydrogen atoms, or both.

In further embodiments, in 1,3-diethers of formulae (II) and (III) all the $R^{III}$ radicals are hydrogen, and all the $R^{IV}$ radicals are methyl. Moreover, in additional embodiments the 1,3-diethers of formula (III) in which two or more of the $R^V$ radicals are bonded to each other to form one or more condensed cyclic structures, such as benzene, optionally substituted by $R^{VI}$ radicals, are used. In some embodiments, compounds of formula (IV) are utilized:

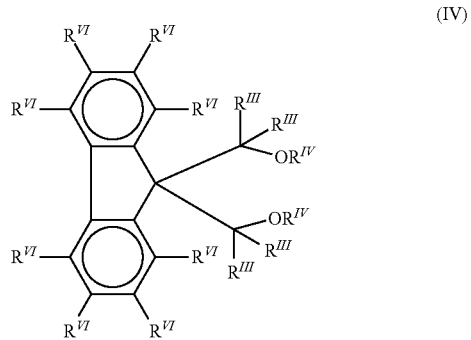

(IV)

where the $R^{VI}$ radicals equal or different are hydrogen; halogens, such as Cl and F; $C_1$-$C_{20}$ alkyl radicals, linear or branched; $C_3$-$C_{20}$ cycloalkyl, $C_6$-$C_{20}$ aryl, $C_7$-$C_{20}$ alkylaryl and $C_7$-$C_{20}$ aralkyl radicals, optionally containing one or more heteroatoms selected from the group consisting of N, O, S, P, Si and halogens, in particular Cl and F, as substitutes for carbon or hydrogen atoms, or both; and the radicals $R^{III}$ and $R^{IV}$ are as defined above for formula (III).

Specific examples of compounds comprising formulae (III) and (IV) are:
1,1-bis(methoxymethyl)-cyclopentadiene;
1,1-bis(methoxymethyl)-2,3,4,5-tetramethylcyclopentadiene;
1,1-bis(methoxymethyl)-2,3,4,5-tetraphenylcyclopentadiene;
1,1-bis(methoxymethyl)-2,3,4,5-tetrafluorocyclopentadiene;
1,1-bis(methoxymethyl)-3,4-dicyclopentylcyclopentadiene;
1,1-bis(methoxymethyl)indene; 1,1-bis(methoxymethyl)-2,3-dimethylindene;
1,1-bis(methoxymethyl)-4,5,6,7-tetrahydroindene;
1,1-bis(methoxymethyl)-2,3,6,7-tetrafluoroindene;
1,1-bis(methoxymethyl)-4,7-dimethylindene;
1,1-bis(methoxymethyl)-3,6-dimethylindene;
1,1-bis(methoxymethyl)-4-phenylindene;
1,1-bis(methoxymethyl)-4-phenyl-2-methylindene;
1,1-bis(methoxymethyl)-4-cyclohexylindene;
1,1-bis(methoxymethyl)-7-(3,3,3-trifluoropropyl)indene;
1,1-bis(methoxymethyl)-7-trimethyisilylindene;
1,1-bis(methoxymethyl)-7-trifluoromethylindene;
1,1-bis(methoxymethyl)-4,7-dimethyl-4,5,6,7-tetrahydroindene;
1,1-bis(methoxymethyl)-7-methylindene;
1,1-bis(methoxymethyl)-7-cyclopenthylindene;
1,1-bis(methoxymethyl)-7-isopropylindene;
1,1-bis(methoxymethyl)-7-cyclohexylindene;
1,1-bis(methoxymethyl)-7-tert-butylindene;
1,1-bis(methoxymethyl)-7-tert-butyl-2-methylindene;
1,1-bis(methoxymethyl)-7-phenylindene;
1,1-bis(methoxymethyl)-2-phenylindene;
1,1-bis(methoxymethyl)-1H-benz[e]indene;
1,1-bis(methoxymethyl)-1H-2-methylbenz[e]indene;
9,9-bis(methoxymethyl)fluorene;
9,9-bis(methoxymethyl)-2,3,6,7-tetramethylfluorene;
9,9-bis(methoxymethyl)-2,3,4,5,6,7-hexafluorofluorene;
9,9-bis(methoxymethyl)-2,3-benzofluorene;
9,9-bis(methoxymethyl)-2,3,6,7-dibenzofluorene;
9,9-bis(methoxymethyl)-2,7-diisopropylfluorene;
9,9-bis(methoxymethyl)-1,8-dichlorofluorene;
9,9-bis(methoxymethyl)-2,7-dicyclopentylfluorene;
9,9-bis(methoxymethyl)-1,8-difluorofluorene;
9,9-bis(methoxymethyl)-1,2,3,4-tetrahydrofluorene;
9,9-bis(methoxymethyl)-1,2,3,4,5,6,7,8-octahydrofluorene; and
9,9-bis(methoxymethyl)-4-tert-butylfluorene.

As explained above, the catalyst component (a) comprises, in addition to the above electron donors, a titanium compound having at least a Ti-halogen bond and a Mg halide. The magnesium halide is, in certain embodiments, $MgCl_2$ in active form, which is widely known from the patent literature as a support for Ziegler-Natta catalysts. U.S. Pat. Nos. 4,298,718 and 4,495,338 were the first to describe the use of these compounds in Ziegler-Natta catalysis. It is known from these patents that the magnesium dihalides in active form used as support or co-support in components of catalysts for the polymerization of olefins are characterized by X-ray spectra in which the most intense diffraction line that appears in the spectrum of the non-active halide is diminished in intensity and is replaced by a halo whose maximum intensity is displaced towards lower angles relative to that of the more intense line.

The titanium compounds used in the catalyst component of the present disclosure may include $TiCl_4$ and $TiCl_3$; furthermore, also Ti-haloalcoholates of formula $Ti(OR)_{n-y}X_y$ can be used, where n is the valence of titanium, y is a number between 1 and n–1, X is halogen and R is a hydrocarbon radical having from 1 to 10 carbon atoms.

In some embodiments, the catalyst component (a) has an average particle size higher than 50 μm, such as higher than 60 and ranging from 70 to 100 μm. In further embodiments, the porosity determined by the mercury method of the solid catalyst component due to pores with radii equal to or less than 1 μm is at least 0.35 cm$^3$/g, including higher than 0.40 and ranging from 0.45 cm$^3$/g to 0.6 cm$^3$/g.

In additional embodiments, the succinate is present in amount ranging from 50 to 90% by weight with respect to the total amount of donors, such as 60 to 85% by weight and from 65 to 80% by weight. The 1,3-diether may constitutes the remaining amount with respect to the total amount of donors.

The alkyl-Al compound (b) is, in certain embodiments, chosen among the trialkyl aluminum compounds such as for example triethylaluminum, tri-n-hexylaluminum, tri-n-octylaluminum. It is also possible to use mixtures of trialkylaluminums with alkylaluminum halides, alkylaluminum hydrides or alkylaluminum sesquichlorides such as $AlEt_2Cl$ and $Al_2Et_3Cl_3$.

In some embodiments, external electron-donor compounds (c) for use in the present technology include silicon compounds, ethers, esters such as ethyl 4-ethoxybenzoate, amines, heterocyclic compounds and 2,2,6,6-tetramethyl piperidine, ketones and the 1,3-diethers. Another class of external donor compounds that may be used is silicon compounds of the formula $R_a^5R_b^6Si(OR^7)_c$, where a and b are integer from 0 to 2, c is an integer from 1 to 3 and the sum (a+b+c) is 4; $R^5$, $R^6$, and $R^7$, are alkyl, cycloalkyl or aryl radicals with 1-18 carbon atoms optionally containing heteroatoms, including methylcyclohexyldimethoxysilane, diphenyldimethoxysilane, methyl-t-butyldimethoxysilane, dicyclopentyldimethoxysilane, 2-ethylpiperidinyl-2-t-butyldimethoxysilane, 1,1,1,trifluoropropyl-2-ethylpiperidinyl-dimethoxysilane and 1,1,1,trifluoropropyl-metil-dimethoxysilane. The external electron donor compound may be used in such an amount to give a molar ratio between the organo-aluminum compound and the electron donor compound of from 5 to 500, from 7 to 400 and from 10 to 200.

In some embodiments, the contact of step (i) is carried out at a temperature ranging from 40 to 50° C. The time of the treatment, in certain embodiments, ranges from 3 to 40 minutes.

The above catalyst components (a), (b) and optionally (c) are fed to a pre-contacting vessel, in amounts such that the weight ratio (b)/(a) is in the range of 2-15, such as from 5-10.

In the process of the present disclosure the compound (c) may be present and used in amounts to give a molar ratio between the organo-aluminum compound (b) and the electron donor compound of from 1 to 250, such as from 3 to 150 and from 5 to 100. The pre-contact vessel can be either a stirred tank or a loop reactor in which the catalyst forming components may be contacted, under stirring, with a liquid inert hydrocarbon solvent such as, e.g. propane, n-hexane or n-heptane. In some embodiments, propylene is absent in the pre-contacting step.

The pre-contacted catalyst can then be fed to the pre-polymerization reactor where step (ii) can take place.

The pre-polymerization step can be carried out in a first reactor selected from a loop reactor or a continuously stirred tank reactor or in a sequence of two loop reactors. The pre-polymerization can be carried out either in gas-phase or in liquid-phase. The liquid medium comprises liquid alpha-olefin monomer(s), optionally with the addition of an inert hydrocarbon solvent. In certain embodiments, the hydrocarbon solvent can be either aromatic, such as toluene, or aliphatic, such as propane, hexane, heptane, isobutane, cyclohexane and 2,2,4-trimethylpentane. The amount of hydrocarbon solvent, if any, is lower than 40% by weight with respect to the total amount of alpha-olefins, such as lower than 20% by weight. In some embodiments, step (ii) is carried out in the presence of inert hydrocarbons such as propane.

The average residence time in this reactor generally ranges from 20 to 150 minutes, such as from 30 to 80 minutes. The temperature is comprised between 10° C. and 50° C., such as between 20° C. and 40° C. Adopting these conditions allows one to obtain a pre-polymerization degree in the preferred range from 60 to 800 grams (g) per gram of solid catalyst component, such as from 150 to 500 g per gram of solid catalyst component. In certain embodiments, step (ii) is further characterized by a low concentration of solid in the slurry, typically in the range from 50 g to 300 g of solid per liter of slurry.

The pre-polymerization step may be carried out in the absence of any molecular weight regulator, such as hydrogen. Alternatively, in some cases hydrogen can be fed to the pre-polymerization reactor, thus tailoring the intrinsic viscosity of the pre-polymer obtained from step b) in a range between 0.2 and 6.0 dl/g.

A polymeric slurry containing the pre-polymer/catalyst system may be discharged from the pre-polymerization reactor and is continuously fed to the polymerization step (iii).

The polymerization step (iii) of the present disclosure may be carried out in gas-phase reactors, such as in a sequence of two or more fluidized bed reactors.

In the fluidized bed reactor of step iii) propylene is polymerized to give the semi-crystalline matrix. A gaseous mixture comprising propylene, optionally with a comonomer, using hydrogen as molecular weight regulator, and an inert gas may be fed to the gas-phase reactor. Limited amounts of olefin comonomers may be also be fed during step iii). In some embodiments, the total amount of comonomers incorporated in the semi-crystalline matrix is less than 10% by weight, such as less than 5% by weight. Comonomers for use in the present technology include ethylene, 1-butene, 1-hexene and 1-octene. The Melt Flow Rate value according to ISO 1133 (230° C., 2.16 kg) can vary within a wide range from 0.01 to 300 g/10 min, including from 0.1 to 250 g/10 min. The porosity of the polymer coming from step (iii), in certain embodiments, ranges from 0.33 to 0.60 $cm^3/g$, including from 0.35 to 0.60 and from 0.40 to 0.55 $cm^3/g$. In some embodiments, the polymer bulk density ranges from 0.30 to 0.37 $g/cm^3$. The amount of insoluble fraction in xylene at 25° C. of the porous polymer produced with the process of the invention may be greater than 97% by weight, such as ranging from 97.5 to 99% by weight when propylene homopolymer is used. In the case of preparation in step iii) of small amounts of comonomers the crystallinity of the polymer becomes lower and the amount of xylene soluble fraction increases.

The operating temperature is selected, in certain embodiments, between 50 and 120° C., including between 60 and 85° C., while the operating pressure may be between 1.0 and 3.0 MPa, such as between 1.4 and 2.5 MPa.

The hydrogen/propylene molar ratio is, in certain embodiments, between 0.0002 and 0.7, while the propylene monomer may comprise from 10% to 100% by volume, including from 30 to 70% by volume, based on the total volume of the gases present in the reactor. In further embodiments, the remaining portion of the feeding mixture is comprised of inert gases and one or more α-olefin comonomers, if any. Inert gases useful to dissipate the heat generated by the polymerization reaction may be selected from nitrogen or saturated light hydrocarbons such as propane.

Inert gases can also be used for adjusting the production split in the overall polymerization process, i.e. in the sequence of serially connected gas-phase reactors.

In the preparation of heterophasic copolymers, in certain embodiments the polymer produced in the polymerization step iii) represents from 15 to 90% by weight, such as from 20 to 60% by weight, of the heterophasic copolymer produced in the overall process. In this type of processes, the polymer may be transferred to a successive polymerization step iv). In some embodiments, the polymer powder is generally passed through a solid/gas separation step, in order to prevent the gaseous mixture discharged by the first reactor from entering the gas-phase reactor of step iv). The gaseous mixture may be separated and recycled back to the first polymerization reactor, while the polymer particles are fed to polymerization step iv).

In some embodiments, step iv) is carried out in one or more gas-phase reactors, including fluidized bed reactors, to prepare one or more olefin copolymers partially soluble in xylene at ambient temperature in a percentage higher than 15% by weight, such as from 40 to 95% by weight. In certain embodiments, the copolymers may be selected from:
copolymers of ethylene/propylene, ethylene/1-butene, ethylene/1-hexene;
copolymers of propylene/1-butene, propylene/1-hexene;
terpolymers of ethylene, propylene and α-olefin $C_4$-$C_{12}$.

In additional embodiments, copolymers of ethylene with propylene and/or 1-butene are prepared in step iv) according to the present disclosure.

According to one embodiment of the disclosure, the polymerization step iv) is carried out in a single fluidized bed reactor, wherein a copolymer of ethylene with propylene and/or 1-butene is prepared, the copolymer containing from 10 to 80% by weight of ethylene.

According to an alternative embodiment of the disclosure, the polymerization step iv) comprises a sequence of two fluidized bed reactors, so that two distinct ethylene copolymers with a different ethylene/comonomer composition can be prepared.

When different ethylene concentrations are established in the polymerization reactors of step iv), the process of the present disclosure advantageously allows for the use of a more amorphous elastomeric component with a less amorphous elastomeric component, simultaneously providing an efficient dispersion of the two elastomeric components into the crystalline matrix produced in the first polymerization step iii).

The polymer produced in step iv) is, in some embodiments, an ethylene copolymer containing from 15 to 75% wt of a $C_3$-$C_{10}$ alpha olefin, optionally containing minor proportions of a diene, and at least 60% soluble in xylene at room temperature. In further embodiments, the alpha-olefin is selected from propylene or butene-1 and its content ranges from 20 to 70% by weight.

The final polymer composition obtained through the process of the technology comprises, in certain embodiments, 30-90 parts by weight, including 40-80 parts by weight of (A) a propylene polymer optionally containing minor amounts of ethylene and/or $C_4$-$C_{10}$ alpha olefins being insoluble in xylene at 25° C., as well as 10-70 and 20-60 parts by weight of (B) an ethylene copolymer soluble in xylene, which may contain from 20 to 70% of $C_3$-$C_{10}$ alpha olefin. The propylene polymer compositions having a ratio between the intrinsic viscosities of the polymer produced in step iii) and that of the polymer produced in step iv) in tetrahydronaphthalene at 135° C. of the portion soluble in xylene and of the portion insoluble in xylene at room temperature may be from 0.3 to 5.

The total ethylene content is, in certain embodiments, higher than 9%, such as higher than 10% and ranging from 10 to 50% by weight.

The value of the intrinsic viscosity of the xylene soluble fraction determined on the reactor grade polymer composition ranges, in certain embodiments, from 0.5 dl/g to 6.0 dl/g.

The compositions obtained according to the process of the present disclosure can be obtained as reactor grade product with a Melt Flow Rate value according to ISO 1133 (230° C., 2.16 Kg) ranging from 0.01 to 100 g/10 min, including from 0.1 to 70 and from 0.2 to 60. The compositions can optionally be visbroken according to known techniques in order to reach the final MFR value suited for the selected application. The chemical degradation of the polymer (visbreaking) may be carried out in the presence of free radical initiators, such as peroxides. Examples of radical initiators that can be used for this purpose are 2,5-dimethyl-2,5-di (tert-butylperoxide)-hexane and dicumyl peroxide. The degradation treatment may be carried out by using the appropriate quantities of free radical initiators, and may take place in an inert atmosphere such as nitrogen. Methods, apparatus, and operating conditions known in the art can be used to carry out this process.

Depending on the operating conditions selected in the above defined steps from i) to iv), the heterophasic propylene copolymers obtained by means of the present disclosure can be used in a wide range of applications due to the high versatility of the claimed process. Some of the main advantages are achieved in the following fields:
roofing/geomembranes/bitumen in view of the optimal balance of fluidity, softness, weldability;
automotive in view of the optimal balance of stiffness, impact resistance, shrinkage, fluidity; and injection molding in view of the optimal balance of fluidity, impact resistance, stiffness and transparency.

EXAMPLES

The following examples are given in order to better illustrate the disclosure without limiting it in any manner.
Characterization
The data of the propylene polymer materials were obtained according to the following methods:
Xylene-Soluble Fraction
2.5 g of polymer and 250 mL of o-xylene are introduced in a glass flask equipped with a refrigerator and a magnetic stirrer. The temperature is raised in 30 minutes up to the boiling pint of the solvent. The resulting solution is kept under reflux and stirring for 30 minutes. The closed flask is then kept for 30 minutes in a thermostatic water bath at 25° C. The resulting solid is filtered on quick filtering paper and the filtered liquid is divided into two 100 ml aliquots. One 100 ml aliquot of the filtered liquid is poured in a previously weighed aluminum container, which is heated on a heating plate under nitrogen flow, to remove the solvent by evaporation. The container is then kept on an oven at 80° C. under vacuum until a constant weight is obtained. The residue is weighed to determine the percentage of xylene-soluble polymer.
Comonomer Content of the Final Polymer:
Determined by IR spectroscopy
Molar Ratio of Feed Gasses:
Determined by gas-chromatography
Melt Flow Rate (MFR)
Determined according to ISO 1133 (230° C., 2.16 kg)
Porosity and Surface Area with Mercury:
The measure is carried out using a "Porosimeter 2000 series" by Carlo Erba.
The porosity is determined by measuring the absorption of mercury under pressure. A calibrated dilatometer (diameter of 3 mm) $CD_3$ (Carlo Erba) connected to a reservoir of mercury and to a high-vacuum pump ($1 \cdot 10^{-2}$ mbar) is used. A weighed amount of sample is placed in the dilatometer. The apparatus is then placed under high vacuum (<0.1 mm Hg) and is maintained at these conditions for 20 minutes. The dilatometer is then connected to the mercury reservoir and the mercury is allowed to flow slowly into it until it reaches the level marked on the dilatometer at a height of 10 cm. The valve that connects the dilatometer to the vacuum pump is closed and the mercury pressure is gradually increased using nitrogen to 140 kg/cm². Under the effect of the pressure, the mercury enters the pores and the level goes down according to the porosity of the material.

The porosity (cm³/g), due to pores up to 1 μm for catalysts (10 μm for polymers), the pore distribution curve, and the average pore size are directly calculated from the integral pore distribution curve, which is a function of the volume reduction of the mercury and applied pressure values (all these data are provided and elaborated by the porosimeter associated computer which is equipped with a "MILESTONE 200/2.04" program by C. Erba).

Poured Bulk Density [g/cm³]: measured according to DIN-53194.

General Procedure for the Preparation of $MgCl_2 \cdot (EtOH)_m$ Adducts.

An initial amount of microspheroidal $MgCl_2 \cdot 2.8C_2H_5OH$ was prepared according to the method described in Example 2 of U.S. Pat. No. 4,399,054, but operating at 3,000 rpm instead of 10,000 rpm. The resulting adduct had an average particle size of 87 μm was then subjected to thermal dealcoholation at increasing temperatures from 30 to 130° C. in a nitrogen current until the molar alcohol content per mol of Mg is 1.16.

Preparation of Solid Catalyst Component—General Procedure.

Into a 1000 mL four-necked round flask, purged with nitrogen, 500 mL of $TiCl_4$ were introduced at 0° C. While stirring, 30 grams of the microspheroidal $MgCl_2 \cdot 1.16C_2H_5OH$ adduct (prepared as described above) were added. The temperature was raised to 120° C. and kept at this value for 60 minutes. During the temperature increase, an amount of diethyl 2,3-diisopropylsuccinate was added such as to have a Mg/succinate molar ratio of 11. After 60 minutes, the stirring was stopped, the liquid siphoned off and treatment with $TiCl_4$ was repeated at 100° C. for 1 hour in the presence of an amount of 9,9-bis(methoxymethyl)fluorene for producing a Mg/donor molar ratio of 7. The stirring was stopped, the liquid siphoned off and the treatment with $TiCl_4$ was repeated at 100° C. for 30 min. After sedimentation and siphoning at 75° C. the solid was washed six times with anhydrous hexane (6×100 ml) at 60° C.

Examples 1-3 and Comparative Example 1

General Polymerization Conditions

The polymerization is carried out in continuous by means of a process setup comprising:
- a 1.5 liter vessel for the pre-contact of the catalyst components;
- a loop prepolymerization reactor having a volume of 80 liters; and
- a sequence of two serially connected fluidized bed reactors, each having a volume of 1.5 m³.

Example 1

Precontacting—Step i

A Ziegler-Natta catalyst system was used as the polymerization catalyst, comprising:
- a solid catalyst component prepared with the procedure described above;
- triethylaluminum (TEAL) as the cocatalyst; and
- dicyclopentyldimethoxysilane (DCPMS) as the external donor.

The solid catalyst components are fed to the pre-contacting vessel, where the weight ratio TEAL/solid catalyst was 4, and the weight ratio TEAL/DCPMS was 4.

The components were pre-contacted at a temperature of 40° C. for 9 minutes.

Prepolymerization—Step ii

The catalyst system withdrawn from the pre-contacting vessel was continuously fed to the prepolymerization loop reactor together with a liquid stream of propylene and propane. The prepolymerization in the loop reactor was operated with a weight ratio $C_3H_8/C_3H_6$ of 1.5, at the temperature reported in Table 1.

Polymerization—Step iii

A polypropylene slurry was continuously discharged from the loop reactor and fed to the first fluidized bed reactor, where propylene was polymerized using $H_2$ as the molecular weight regulator and in the presence of propane as inert diluent. Ethylene was used as the comonomer and fed to this reactor. The polymerization was carried out at a temperature of 80° C. and at a pressure of 2.0 MPa.

The composition of the gas phase in the fluidized bed reactor is specified in Table 1, as well as some properties of the resulting semi-crystalline matrix. It can be seen from Table 1 that the polypropylene resin had a poured bulk density of 0.360 g/cm³ and a porosity of 0.360 cm³/g.

Example 2

Precontacting—Step i

Carried out as described in Example 1, with the difference that the precontacting temperature was 50° C.

Prepolymerization—Step ii

Carried out as described in Example 1.

Polymerization—Step iii

Carried out as described in Example 1 with minor adjustments in the gas-phase composition.

It can be seen from Table 1 that the polypropylene resin had a poured bulk density of 0.340 g/cm³ and a porosity of 0.443 cm³/g. The fraction soluble in xylene is 7.5% by weight.

Example 3

Precontacting—Step i

Carried out as described in Example 2 with the difference that the TEAL/solid catalyst weight ratio was 8.

Prepolymerization—Step ii

Carried out as described in Example 1.

Polymerization—Step III

Carried out as described in Example 1.

The polypropylene resin had a poured bulk density of 0.333 g/cm³ and a porosity of 0.498 cm³/g. The fraction soluble in xylene amounted to 7.5% by weight.

Polymerization—Step iv

The resulting semi-crystalline polymer was continuously discharged from the first reactor, separated from propylene and propane by means of a gas/solid separator, and then introduced into a second fluidized bed reactor where an ethylene/propylene copolymer is prepared according to the operative conditions shown in Table 2. The rubbery copolymer obtained in step iv) is characterized by an amount of soluble polymer in xylene of 52.4% by weight having an intrinsic viscosity of 2.45 dl/g. The melt index "L" of the final polymer composition is 3.54 dg/min and its total weight amount of ethylene is 15%.

At the end of the polymerization, the polymer was recovered by removing any unreacted monomers and was dried under vacuum. Precontact conditions and polymerization results are reported in Table 3.

Comparative Example 2

A series of two runs comprising catalyst precontact and propylene polymerization were carried out as described in Example 4 with the only difference that 0.025 grams of solid catalyst prepared as described in Example 1 of WIPO Pat. App. Pub. No. WO2008/015113 were used. At the end of the polymerization, the polymer was recovered by removing any unreacted monomers and was dried under vacuum. Precontact conditions and polymerization results are reported in Table 3.

TABLE 1

|  | T° | Operative conditions | | Operative conditions Step iii) | | | | Properties of the semi-crystalline matrix | | | |
| --- | --- | --- | --- | --- | --- | --- | --- | --- | --- | --- | --- |
|  | Step i) | Step ii) | | $H_2$ % | $C_3^-$ | $C_3^+$ | $C_2^-$ | PBD | MIL | XS | $C_2^-$ |
|  | ° C. | T(° C.) | $C_3^-/C_3^+$ | mol | % mol | % mol | % mol | g/cm³ | dg/min | wt % | % wt |
| Ex. 1 | 40 | 22 | 1.5 | 1.63 | 30.4 | 61.6 | 0.6 | 0.360 | 64 | N.A | 3.5 |
| Ex. 2 | 50 | 22 | 1.5 | 1.97 | 35.2 | 56.4 | 0.63 | 0.340 | 48 | 7.5 | 3.7 |
| Ex. 3 | 50 | 22 | 1.5 | 1.61 | 32.1 | 69.1 | 0.6 | 0.333 | 62 | 7.5 | 3.5 |
| Comp. 1 | 30 | 22 | 1.5 | 1.75 | 32.1 | 63.5 | 0.65 | 0.375 | 72 | 7.9 | 3.4 |

Comparative Example 1

Precontacting—Step i

Carried out as described in Example 1, with the difference that the precontacting temperature was 30° C.

Prepolymerization—Step ii

Carried out as described in Example 1.

Polymerization—Step III

Carried out as described in Example 1.

It can be seen from Table 1 that the polypropylene resin had a poured bulk density of 0.375 g/cm³ and a porosity of 0.324 cm³/g. The fraction soluble in xylene amounted to 7.9% by weight.

Example 4

A series of three runs, each of which comprise catalyst precontact and propylene polymerization, were carried out in an autoclave equipped with a precontacting pot. The equipment of the precontacting pot was a jacketed reactor of 250 mL that under mechanical stirring was charged with 75 mL of hexane, 0.76 grams of TEAL, 0.16 grams of cyclohexylmethyl(dimethoxy) silane and 0.025 grams of solid catalyst prepared as described above at the temperature and for the time reported in Table 3. Under a propylene atmosphere the hexane slurry, with 1.25 NL of hydrogen and 1.2 kg of propylene, was transferred to a 4 liter steel autoclave equipped with a stirrer, pressure gauge and thermometer. The system was heated to 70° C. over 10 minutes under stirring, and maintained under these conditions for 120 min.

TABLE 2

| Polymerization Step IV) | |
| --- | --- |
| Operative conditions - 2$^{nd}$ reactor | Example 3 |
| Temperature (° C.) | 60 |
| Pressure (MPa) | 1.8 |
| $H_2$ (mol %) | 1.9 |
| $C_3H_6$ (mol %) | 42.9 |
| $C_3H_8$ (mol %) | 50.1 |
| $C_2H_4$ (mol %) | 7.5 |
| $H_2/C_2^-$ (mol ratio) | 0.148 |
| $C_2^-/(C_2^- + C_3^-)$ (mol ratio) | 0.257 |

TABLE 3

|  | Time (min) | Temp. (° C.) | Yield (Kg/g) | Bulk Density. (g/mL) | XI (% wt) |
| --- | --- | --- | --- | --- | --- |
| Example 4 | 5 | 20 | 18.8 | 0.343 | 97.8 |
|  | 30 | 50 | 10.2 | 0.270 | 97.5 |
|  | 30 | 60 | 5.5 | 0.220 | 97.2 |
| Comp. 2 | 5 | 20 | 16.8 | 0.357 | 97.4 |
|  | 30 | 50 | 5.3 | 0.300 | 96.6 |

What is claimed is:

1. A process for the preparation of a porous propylene (co)polymer having a porosity higher than 0.33 cm³/g, carried out in the presence of a catalyst system comprising (a) a solid catalyst component comprising a magnesium halide, a titanium compound having at least a Ti-halogen bond and at least two electron donor compounds, one being present in an amount from 50 to 90% by mol with respect to the total amount of donors and selected from succinates, and the other selected from 1,3 diethers, (b) an aluminum alkyl and optionally (c) an external electron donor compound, and comprising the following steps:

(i) contacting the catalyst components (a), (b) and optionally (c) for a period of time ranging from 1 to 60 minutes, at a temperature ranging from 35 to 55° C.;

(ii) optionally pre-polymerizing with one or more olefins of formula $CH_2=CHR$, where R is H or a $C_1$-$C_{10}$ hydrocarbon group, up to forming amounts of polymer from about 0.1 up to about 1000 g per gram of solid catalyst component (a); and (iii) polymerizing propylene in the optional presence of ethylene and/or $C_4$-$C_{10}$ alpha olefins for producing the porous propylene (co)polymer.

2. The process according to claim 1, wherein the contact of step (i) is carried out at a temperature ranging from 40 to 50° C.

3. The process according to claim 1, wherein the time of the contact step (i) ranges from 3 to 40 minutes.

4. The process according to claim 1, wherein the weight ratio (b)/(a) is in the range of 5-10.

5. The process according to claim 1, in which the catalyst component (a) has an average particle size higher than 60 μm.

6. The process according to claim 1, wherein the porosity of the polymer produced in step (iii) ranges from 0.33 to 0.60 $cm^3/g$.

7. The process according to claim 6, wherein the porosity of the polymer produced in step (iii) ranges from 0.35 to 0.60 $cm^3/g$.

8. The process according to claim 1, in which the catalyst component (a) has a porosity higher than 0.40 $cm^3/g$.

* * * * *

UNITED STATES PATENT AND TRADEMARK OFFICE
CERTIFICATE OF CORRECTION

PATENT NO. : 9,683,062 B2
APPLICATION NO. : 15/031913
DATED : June 20, 2017
INVENTOR(S) : Benedetta Gaddi et al.

Page 1 of 1

It is certified that error appears in the above-identified patent and that said Letters Patent is hereby corrected as shown below:

On the Title Page

| | | |
|---|---|---|
| Column 1 (73) | Line 12 | Delete "Poliolefin" and insert --Poliolefine-- |
| Column 2 (56) | Line 14 | In Other Publications, delete "Opinon" and insert --Opinion-- |

In the Specification

| | | |
|---|---|---|
| Column 3 | Line 44 | Delete "2,3-dibenzyl succinate," and insert --2,3-dibenzylsuccinate,-- |
| Column 3 | Line 45 | Delete "2,3-diisopropyl succinate," and insert --2,3-diisopropylsuccinate,-- |
| Column 3 | Line 47 | Delete "2,3-dineopentyl succinate," and insert --2,3-dineopentylsuccinate,-- |
| Column 3 | Line 48 | Delete "2,3-dicyclopentyl succinate" and insert --2,3-dicyclopentylsuccinate-- |
| Column 3 | Line 49 | Delete "2,3-dicyclohexyl succinate." and insert --2,3-dicyclohexylsuccinate.-- |
| Column 4 | Line 46 | Delete "bis(cyclohexylmethyl)-1,3-dimethoxypropane," and insert --2,2-bis(cyclohexylmethyl)-1,3-dimethoxypropane,-- |
| Column 4 | Line 51 | Delete "iso-propyl-2-isopentyl-1,3-dimethoxypropane," and insert --2-iso-propyl-2-isopentyl-1,3-dimethoxypropane,-- |
| Column 5 | Line 2 | After "radicals", insert --$R^{III}$-- |
| Column 5 | Line 58 | After "1,1-bis(methoxymethyl)indene;", insert --¶-- |

Signed and Sealed this
Ninth Day of June, 2020

Andrei Iancu
*Director of the United States Patent and Trademark Office*